United States Patent

Murakami et al.

[11] Patent Number: 6,166,136
[45] Date of Patent: *Dec. 26, 2000

[54] RESIN COMPOSITION UTILIZING COATED RESIN MOLDINGS AND MULTILAYER RESIN MOLDING

[75] Inventors: Hirofumi Murakami; Kazuhiko Sakai; Akihiro Katagiri, all of Kanagawa; Yoshio Kitawaki, Chiba; Takashi Nakayama, Kanagawa; Kazuo Ito, Tokyo; Atushi Takeuchi, Saitama; Minoru Makuta, Saitama; Hitoshi Ohgane, Saitama; Kenji Hamabe, Saitama; Osamu Aoki, Saitama, all of Japan

[73] Assignees: Japan Polyolefins Co., Ltd.; Honda Giken Kogyo Kabushiki Kaisha, both of Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/119,449

[22] Filed: Jul. 21, 1998

Related U.S. Application Data

[62] Division of application No. 08/723,280, Sep. 30, 1996, Pat. No. 5,817,420.

[30] Foreign Application Priority Data

Sep. 29, 1995 [JP] Japan .................................. 7-253998
Sep. 29, 1995 [JP] Japan .................................. 7-254001

[51] Int. Cl.[7] ............................ C08L 23/10; C08L 23/12; C08L 23/16
[52] U.S. Cl. .......................... 525/125; 525/168; 525/180; 525/222
[58] Field of Search .................... 525/125, 168, 525/180, 222

[56] References Cited

U.S. PATENT DOCUMENTS

| | | | |
|---|---|---|---|
| 4,363,885 | 12/1982 | Fukui et al. | 523/212 |
| 4,434,264 | 2/1984 | Ficker | 525/240 |
| 4,774,292 | 9/1988 | Thiersault et al. | 525/240 |
| 5,128,212 | 7/1992 | Kneale et al. | |
| 5,342,884 | 8/1994 | Tabor et al. | 525/125 |
| 5,354,618 | 10/1994 | Ishigaki et al. | |
| 5,382,631 | 1/1995 | Stehling et al. | 525/240 |
| 5,605,961 | 2/1997 | Lee et al. | 525/125 |
| 5,717,020 | 2/1998 | Kopytko | 525/125 |

FOREIGN PATENT DOCUMENTS

| | | |
|---|---|---|
| 0425923 | 10/1990 | European Pat. Off. . |
| 4221681 | 1/1992 | Germany . |
| 53-64256 | 6/1978 | Japan . |
| 53-64257 | 6/1978 | Japan . |
| 57-11052 | 1/1982 | Japan . |
| 57-55952 | 4/1982 | Japan . |
| 57-15984 | 10/1982 | Japan . |
| 58-111846 | 7/1983 | Japan . |
| 61-259943 | 11/1986 | Japan . |
| 6228332 | 2/1987 | Japan . |
| 63-237924 | 10/1988 | Japan . |
| 4191044 | 7/1992 | Japan . |
| 515486 | 6/1993 | Japan . |
| 5169479 | 7/1993 | Japan . |
| 6-071829 | 3/1994 | Japan . |
| 671829 | 3/1994 | Japan . |
| 6145440 | 5/1994 | Japan . |
| 726044 | 1/1995 | Japan . |

OTHER PUBLICATIONS

Williams, Polymer Letters, vol. 6, pp. 621–624 (1968).
Database WPI, Section Ch., Week 9514, Derwent Publications Ltd., London, GB; Class A17, AN 95–101983.

*Primary Examiner*—Donald R. Wilson
*Attorney, Agent, or Firm*—Sughrue, Mion, Zinn, Macpeak & Seas, PLLC

[57] ABSTRACT

A resin composition utilizing coated resin moldings, the resin composition comprising 100 parts by weight of a crushed material of coated polyolefin resin moldings compounded with from 3 to 15 parts by weight of an ethylene polymer having a weight average molecular weight of from 50,000 to 180,000.

11 Claims, No Drawings

# RESIN COMPOSITION UTILIZING COATED RESIN MOLDINGS AND MULTILAYER RESIN MOLDING

This is a divisional of application Ser. No. 08/723,280 filed Sep. 30, 1996, now U.S. Pat. No. 5,817,420, the disclosure of which is incorporated herein by reference.

FIELD OF THE INVENTION

The present invention relates to a resin composition and more specifically to a resin composition re-using the waste materials of the motorcar bumpers composed of coated polyolefin resin compositions. The present invention also relates to a multilayer resin molding comprising a core material having covering the surface thereof a surface layer, and more specifically to multilayer resin moldings, wherein the resin composition described above is used as the core material.

BACKGROUND OF THE INVENTION

For the bumpers of motorcars, a very high impact resistance is required and thermoplastic resin compositions, for example, polyolefin resin compositions mainly comprising a propylene polymer, an ethylene-propylene copolymer rubber and talc, are widely used and also various resin compositions are proposed as described, e.g., in JP-A-53-64256, JP-A-53-64257, JP-A-57-55952, JP-A-57-159841, and JP-A-58-111846 (the term "JP-A" as used herein means an "unexamined published Japanese patent application").

Many of the bumpers for motorcars are coated products for increasing the designs thereof in addition to satisfy the performance.

Recently, in particular, the environmental issue, the conservation of resources, etc., have been regarded as important and thus the re-using (recycling) of various products, particularly, motorcar parts, has been required.

As a recycling method of the bumpers of motorcars composed of coated thermoplastic resin compositions, a method of crushing the recovered resin moldings by a crusher and utilizing the crushed moldings as raw materials for moldings or a method of after pelletizing the crushed moldings by an extruding machine, and utilizing the pellets as the raw materials for moldings is generally used.

However, when waste coated bumpers are used as recycling materials by these method described above, since the coated resins are poor in the compatibility with a thermoplastic resin such as a polyolefin resin, there is a problem that the impact resistance of the moldings composed of the resin composition prepared by re-using the waste bumpers is lowered. Accordingly, it is difficult to use the re-used materials as the parts requiring the impact resistance as they are.

As a method of improving the impact resistance of the moldings composed of the resin compositions utilizing the waste motorcar parts composed of coated polyolefin resins, the methods described in JP-A-5-154861 and JP-A-5-169479 are known.

In the methods described above, at least 76 parts by weight of various materials compounded for improving the impact resistance are required and thus, the amount of the waste materials becomes relatively small and the use of such a large amount of the compounding materials increases the production cost. Accordingly, it is difficult to completely recycle waste materials existing and generated in a large amount, and thus the foregoing methods are not so effective as a recycling method of waste materials.

In the field of injection molding of thermoplastic resins, sandwich molding for obtaining multilayer moldings has hitherto been practiced. In this method, while the material used for a core material may be same as the material used for a surface layer, a multilayer molding can be produced by using different materials for the core material and the surface layer, whereby a molding having characteristics that are not obtained by using the same kind of material for both the core material and the surface layer is obtained. Because of these advantages, this molding method has recently been widely used in the field of household electric appliances, the field of motorcars, etc., for improving the appearance (prevention of shrinking, bending, etc.) and for the improvement of the rigidity.

In order to avoid the foregoing defects of the recycling materials, a method of restraining lowering of the properties by using the recycling material for the core material and using a new polypropylene resin for the surface layer in sandwich molding has been employed as described, e.g., in JP-A-57-11052, JP-A-61-259943, JP-A-62-28332, JP-A-63-237924, and JP-A-6-71829.

However, even the sandwich molded product as described above shows severe lowering of the properties as compared with the molded product composed of a new resin alone, and the foregoing method cannot thus be applied for the product required to have a high impact resistance at low temperature, such as, exterior parts of motorcars, for example, bumpers, under the existing circumstances.

Since polypropylene does not have a polar group, the coating property onto the polymer moldings of polypropylene is poor, and it has generally been practiced to surface treat polypropylene moldings with the vapor of an organic chlorine solvent such as trichloroethane (TCE), etc., for improving the coating property and then, after coating thereon a primer for hiding the color of the molding itself, to coat the molding with a coating material.

However, since a global environmental issue has been highlighted as a world-wide tendency, it will become impossible to use TCE which is generally used for the pretreatment of coating.

Also, under the tendency of resource saving and cost saving, a so-called gasohol, i.e., a mixed fuel obtained by mixing gasoline with lower alcohols (methanol, ethanol, butanol, etc.) tends to be used as the fuel for motorcars, etc. Since the gasohol adversely affects the adhesion of a base material to be coated and a polyurethane coated layer, there is a possibility that the coated layer is released with the action of the gasohol.

Thus, for solving such a problem, a composition composed of a propylene polymer, an OH group-containing compound, a thermoplastic elastomer, an oligomer having a functional group at the terminal, etc., is proposed as described, e.g., in JP-A-7-26044.

However, although the gasohol resistance can be improved by using the foregoing composition as the surface layer in the sandwich molded product as described above, the properties thereof are greatly lowered as compared with the molded product of a new resin alone, and hence the foregoing composition cannot be applied to the products requiring a high impact resistance at low temperature as exterior parts of motorcars, such as bumpers.

In ordinary sandwich moldings, the kind of resin materials can be changed between the core material and the surface layer, but in the sandwich moldings formed in JP-A-7-26044, there are problems that the low-temperature impact resistance is insufficient and the moldability is inferior for large-sized products.

In the moldings described in JP-A-4-191044, the coating property is not improved and there may be a problem in coating the composition without applying the trichloroethane treatment.

SUMMARY OF THE INVENTION

The present invention has been made for solving the problems described above.

An object of the present invention is to provide a resin composition capable of forming moldings excellent in the impact resistance and the mechanical strength with a high efficiency by compounding a small amount of additives, in spite of the fact that the resin composition is obtained by re-using polyolefin resin moldings having coating applied thereto, the re-using of which has hitherto been considered to be difficult.

Another object of the present invention is to solve the problem in the foregoing conventional sandwich moldings and to provide a multilayer resin molding having sufficient low-temperature impact resistance, heat resistance, rigidity, etc., as moldings such as, for example, motorcar exterior parts, capable of being coated without a trichloroethane vapor treatment, and having a good adhesion to a coated layer and a particularly excellent gasohol resistance.

Other objects and effects of the present invention will be apparent from the following description.

As the result of various investigating for attaining the objects described above, the inventors have discovered that by blending waste materials of a coated polyolefin resin composition such as motorcar bumpers with a specific ethylene polymer at a specific weight ratio, the impact resistance of the moldings composed of the resin composition obtained is greatly improved and injection moldings excellent in mechanical characteristics such as rigidity and heat resistance are obtained.

The present invention relates to a resin composition utilizing coated resin moldings, the resin composition comprising 100 parts by weight of a crushed material of coated polyolefin resin moldings compounded with from 3 to 15 parts by weight of an ethylene polymer having a weight average molecular weight of from 50,000 to 180,000.

The present invention also relates to a multilayer resin molding utilizing coated resin moldings, comprising a core material and a surface layer covering the core material, the core material comprising the resin composition utilizing coated resin moldings described above, and the surface layer comprising a polypropylene resin composition comprising (A) from 30 to 80% by weight of a propylene polymer, (B) from 3 to 20% by weight of a propylene polymer modified with an unsaturated hydroxy compound, (C) from 15 to 40% by weight of a thermoplastic elastomer, and (D) from 0.1 to 10% by weight of an oligomer having a functional group at the terminal thereof.

In a preferred embodiment of the multilayer resin composition according to the present invention, the content of the hydroxy group in the unsaturated hydroxy compound in the foregoing component (B) is at least 0.01% by weight in terms of hydroxyethyl methacrylate based on the total amount of the components (A), (B), and (C) described above.

It is also preferred that the thermoplastic elastomer (C) contains an ethylene-α-olefin copolymer rubber.

Furthermore, it is preferred that the iodine number of the oligomer having a functional group at the terminal (D) is not more than 50.

Furthermore, it is also preferred that the melting point of the oligomer having the functional group at the terminal (D) is from 40° C. to 100° C.

According to the present invention, moldings capable of restraining lowering of the impact resistance of the molded products even by using waste materials, having a good adhesion to a coated layer, having an excellent resistance to a gasohol, and being excellent in mechanical characteristics such as the rigidity and the impact resistance at low temperature can be realized.

In the present invention, as the coated thermoplastic resin moldings, bumpers of motorcars are particularly suitably used.

DETAILED DESCRIPTION OF THE INVENTION

The waste materials of motorcar bumpers (hereinafter, sometimes referred to simply as waste materials) comprising coated polyolefin resin moldings being re-used are explained.

The waste materials used in the present invention are polyolefin resin moldings, and the resin moldings coated on the surfaces thereof with a coating material resin, such as an acrylic resin, a polyurethane resin, an unsaturated polyester resin, etc.

The content of the coated resin contained in the waste materials is generally not more than 5% by weight, and preferably not more than 3% by weight. This is because if the content of the coated resin is more than 5% by weight, the effect of improving the impact resistance tends to be small.

For re-using the waste materials, for the convenience of mixing, the waste materials are first subjected to a crushing treatment. The size of the crushed product of the waste materials can be properly selected but the crushed product having the longest length of from 0.1 mm to 10 mm is preferred because of the easiness of mixing.

As the polyolefin resin composition, various materials are widely applied such as motorcar parts, household electric appliances, furniture, and sundries. For example, as the motorcar parts, there are exterior parts such as bumpers, spoilers, side seal garnishes, etc., and interior parts such as instrument panels, door linings, etc.

In the present invention, the coated polyolefin resin compositions, the re-using of which have hitherto been difficult, can be re-used, and thus polyolefin resin compositions that were not be coated can also be re-used.

The ethylene polymers used in the present invention include a homopolymer of ethylene and a copolymer of ethylene and an α-olefin having carbon atoms, the number of which is no more than 12.

In the case of the copolymer of ethylene and an α-olefin, the copolymerization ratio of the α-olefin is generally not more than 20% by weight, and preferably not more than 15% by weight.

Examples of the α-olefin include propylene, butene-1, hexene-1, 4-methylpentene-1, and octene-1.

The weight average molecular weight of the ethylene polymer is from 50,000 to 180,000, and preferably from 55,000 to 130,000. This is because if the ethylene polymer having the weight average molecular weight of less than 50,000 is used, the impact resistance thereof is insufficient, and if the weight average molecular weight is more than 180,000, a uniform resin composition is difficult to obtain and the impact resistance is rather lowered.

The density of the ethylene polymer is generally from 0.900 to 0.975 g/cm³, and preferably from 0.910 to 0.970 g/cm³.

In the resin composition of the present invention, the amount of the ethylene polymer is from 3 to 15 parts by weight, preferably from 3 to 13 parts by weight, and particularly preferably from 5 to 13 parts by weight, per 100 parts by weight of the waste materials.

If the amount of the ethylene polymer per 100 parts by weight of the waste materials is less than 3 parts by weight, the effect of improving the impact resistance is insufficient, while if the amount thereof is more than 15 parts by weight, the mechanical strength such as the rigidity and the heat resistance are undesirablly lowered.

For compounding the waste materials and the ethylene polymer, both the components are uniformly mixed. Upon mixing, various additives which are generally added in the field of polyolefin resins, such as an antioxidant, a heat stabilizer, a light stabilizer, a plasticizer, an antistatic agent, a flame retardant, a lubricant, a foaming agent, a crosslinking agent, a coloring agent, a pigment, an inorganic filler, etc., may be added in the range of substantially not reducing the properties of the resulting resin composition. If necessary, various kinds of synthetic resins can be added.

For mixing the compositions, a method which is generally carried out in the field of synthetic resins may be applied. Examples of the mixing method include dry blending using a mixing apparatus such as a tumbler, a ribbon blender, a Henschel mixer, etc., and melt-kneading using a mixer such as a screw-type extruder, a kneader, a banbury mixer, etc. In this case, by previously dry blending the compositions and further melt-kneading the mixture obtained, a more uniform composition can be obtained.

The moldings using the resin composition of the present invention can be obtained by various molding methods generally employed in the field of synthetic resins. Among the molding methods, an injection molding method is preferred because of its excellent molding efficiency.

In the case of melt-kneading the components described above and in the case of molding the moldings, it is necessary to practice these methods at a temperature at which the polyolefin resin melts, but since if the method is practiced at a higher temperature than a necessary temperature, the polyolefin resin is sometimes thermally decomposed, the melt-kneading temperature and the molding temperature are generally from 180 to 270° C., and preferably from 180 to 250° C.

The moldings obtained using the resin composition of the present invention contain therein resins of a coating material, but the impact resistance of the moldings is greatly improved as compared with the original waste materials.

It is considered that in the resin composition of the present invention, since the dispersibility of rubber components, etc., in the waste materials is improved by adding a small amount of the ethylene polymer to the waste materials followed by kneading, the impact resistance is greatly improved.

The multilayer resin molding of the present invention comprises a core material composed of the foregoing resin composition of the present invention and a surface layer covering the core material.

The surface layer will be explained below.

The polypropylene resin (A) used in the surface layer of the multilayer resin molding of the present invention is not particularly limited, and examples thereof include a propylene homopolymer, a crystalline propylene-ethylene copolymer, and a crystalline propylene-a-olefin copolymer, which are generally used.

The melt flow rate (measured according to ASTM-D1238, at a load of 2.16 kg and at a temperature of 230° C., hereinafter sometimes referred to MFR) of the polypropylene resin used in the present invention is preferably from 0.3 to 100 g/10 minutes, more preferably from 3 to 100 g/10 minutes, and particularly preferably from 3 to 70 g/10 minutes.

If MFR is less than the foregoing lower limit, there is a possibility that the molding property of the composition becomes inferior. If MFR is more than the foregoing upper limit, there is a possibility that the impact resistance of the composition becomes inferior.

At the practice of the present invention, the foregoing polypropylene resin may be used singly or as a mixture of two or more kinds of the resins.

The component (A) is contained in the resin composition of the present invention in an amount of from 30 to 80% by weight, preferably from 35 to 70% by weight, and more preferably from 35 to 60% by weight, based on the total amount of the resin composition forming the surface layer. If the content of the component (A) is less than 30% by weight, the rigidity and the heat resistance of the molded products are lowered, while if the content thereof is more than 80% by weight, the low-temperature impact resistance and the gasohol resistance of the molded products are lowered.

The propylene polymer modified with an unsaturated hydroxy compound (B) (hereinafter, referred to as modified PP resin) used in the present invention can be obtained by modifying the polypropylene resin with an unsaturated hydroxy compound and an organic peroxide, and the production method is described in detail, e.g., in JP-B-3-5420 (the term "JP-B" as used herein means an "examined published Japanese patent application").

As the raw material for producing the modified PP resin used in the present invention, the materials the same as the foregoing component (A) can be used, but from the point of increasing the rigidity, the use of a propylene homopolymer is preferred.

From the moldability and the mechanical characteristics of the composition obtained, MFR of these polymers is generally from 0.01 to 100 g/10 minutes, preferably from 0.01 to 80 g/10 minutes, and particularly preferably from 5 to 80 g/10 minutes.

The unsaturated hydroxy compounds which is used for modifying the polypropylene resin include a compound having at least one unsaturated bond (a double bond or a triple bond) and having a hydroxy group (hereinafter, the compound is referred to as a hydroxy compound). Examples of such a hydroxy compound include an alcohol having a double bond, an alcohol having a triple bond, an ester of a monohydric or dihydric unsaturated carboxylic acid and an unsaturated dihydric alcohol, and an ester of the unsaturated carboxylic acid and an unsubstituted polyhydric alcohol.

Specific examples thereof include 2-hydroxyethyl (meth)acrylate, 2-hydroxypropyl (meth)acrylate, and 2-hydroxybutyl (meth)acrylate. The term "(meth)acrylate" and the like used herein means "acrylate or methacrylate" and the like.

As the organic peroxide which is used for modifying the foregoing polypropylene resin, any organic peroxides which are generally used as initiators in a radical polymerization or as crosslinking agents of polymers can be used, and the half-life thereof of one minute is preferably at least 100° C., and particularly preferably at least 130° C.

Examples of the organic peroxide include 1,3-bis(t-butylperoxy-isopropyl)-benzene, dicumyl peroxide, benzoyl peroxide, and 2,5-dimethyl-2,5-dibenzoylperoxyhexane.

In the case of producing the modified PP resin used in the present invention, the mixing ratio of the hydroxy compound per 100 parts by weight of the polypropylene resin is preferably from 0.1 to 50 parts by weight, more preferably from 0.2 to 30 parts by weight, and particularly preferably from 0.3 o 20 parts by weight. If the mixing ratio of the hydroxy compound per 100 parts by weight of the polypropylene resin is less than 0.1 part by weight, the effect of improving the adhesion may be insufficient. If the mixing ratio is more than 50 parts by weight, further improvement of the coating adhesion corresponding to the using amount is not obtained and there is rather an undesirable possibility that the inherent properties of the polypropylene resin are reduced.

The mixing amount of the organic peroxide per 100 parts by weight of the polypropylene resin is preferably from 0.01 to 20 parts by weight, and particularly preferably from 0.1 to 7 parts by weight. If the mixing amount of the organic peroxide per 100 parts by weight of the polypropylene resin is less than 0.01 part by weight, there is a possibility that the effect of adhesion to a coated layer is lowered, while if the mixing ratio is more than 20 parts by weight, there is a possibility that the inherent mechanical properties of the propylene polymer are lowered, which are all undesirable.

The modified PP resin used as the surface layer of the multilayer resin molding of the present invention can be produced by mixing the polypropylene resin, the hydroxy compound, and the organic peroxide described above at the foregoing mixing ratio and treating by heating the mixture. In this case, the polypropylene resin, the hydroxy compound, and the organic peroxide may be treated while mixing them, but the modified PP resin can be produced by previously dry-blending them or kneading them at a relatively low temperature (a temperature at which the hydroxy compound is not reacted) and then heating the mixture thus obtained.

When the pre-treatment (mixing or kneading) is practiced at a high temperature, the polypropylene resin is sometimes deteriorated. For graft polymerizing the polypropylene resin and the hydroxy compound, the treatment must be practiced at a temperature of decomposing the organic peroxide used. The treatment temperature differs according to the kind of the organic peroxide used but the treatment is generally practiced at a temperature of generally from 160 to 300° C., and preferably from 170 to 280° C.

The foregoing modified PP resin is contained in the composition forming the surface layer in the amount of from 3 to 20% by weight, preferably from 5 to 20% by weight, and particularly preferably from 5 to 15% by weight, based on the total amount of the resin composition forming the surface layer. If the content of the modified PP resin is less than 3% by weight, the coating property and particularly the gasohol resisting property are lowered, while if the content is more than 20% by weight, the rigidity and the low-temperature impact resistance of the molding are lowered.

Preferred examples of the thermoplastic elastomer (C), which is used in the surface layer of the multilayer resin molding of the present invention, include olefinic elastomers such as an ethylene-propylene rubber (EPR), an ethylene-butylene rubber (EBR), an ethylene-propylenebutylene rubber (EPBR), an ethylene-propylene-diene rubber (EPDM), etc., and styrene series elastomers such as a styrene-butadiene-styrene rubber (SBS), a styrene-isobutylene-styrene rubber (SIS), a hydrogenated rubber of SBS (SEBS), a hydrogenated rubber of SIS (SEPS), a styrene-butadiene rubber (SBR), etc. Among these, the use of EPR, EBR, EPBR, SEBS, or SEPS is particularly preferred.

The foregoing thermoplastic elastomer (C) is used singly or as a mixture thereof and is contained in the resin composition forming the surface layer of the multilayer resin molding of the present invention in an amount of from 15 to 40% by weight, preferably from 20 to 40% by weight, and more preferably from 20 to 35% by weight, based on the total amount of the resin composition forming the surface layer. If the content of the thermoplastic elastomer is less than 15% by weight, the low-temperature impact strength and the coating property of the molded product are lowered, while if the content thereof is more than 40% by weight, the rigidity of the molded product is lowered.

The oligomer having a functional group at the terminal thereof (D), included in the surface layer of the multilayer resin molding of the present invention, is an oligomer having a functional group at at least one terminal in one molecule.

Examples of the functional group include a hydroxy group, an amino group, a carboxy group, an epoxy group, a thiol group, etc., and two or more kinds of the functional groups may be used together if they are not reacted with each other. In these functional groups, from the affinity with a urethane coating material, it is preferred that the oligomer contains a hydroxy group or an amino group.

The number average molecular weight of the oligomer having a hydroxy group at the terminal thereof is generally from 300 to 10,000, preferably from 500 to 8,000, and more preferably from 500 to 6,000. If the number average molecular weight is more than 10,000, the improvement of the coating property is not obtained, which shows the addition of such an oligomer giving no effect.

As the oligomer used in the present invention, those having an unsaturated bond in the inside thereof are generally available at a low cost. The iodine number of the oligomer (the gram number of iodine added into 100 g of the oligomer) is preferably not greater than 50, more preferably not greater than 30, and particularly preferably not greater than 10. If the iodine number is smaller, the resin composition molding of the present invention has an excellent adhesion strength with a urethane coated layer and in particular has a good gasohol resistance.

Practical examples of the oligomer having a hydroxy group used in the present invention include polybutadiene (the polymerization mode may be 1,2- or 1,4-, and in the latter case, the double bond may be cis or trans), polyisoprene, an isobutylene-isoprene copolymer (butyl rubber), polybutene, a butadiene-acrylonitrile copolymer, a styrene-butadiene copolymer (the copolymer may be a block copolymer or a random copolymer), a petroleum resin, and the partially or completely hydrogenated oligomers described above, and the oligomer has at least one functional group at the terminal thereof in one molecule and has a number average molecular weight of not more than 10,000.

The addition amount of the oligomer having a hydroxy group at the terminal being used in the present invention is from 0.1 to 10% by weight, preferably from 0.5 to 10% by weight, and more preferably from 0.5 to 5% by weight, based on the total amount of the resin composition forming the surface layer. If the addition amount thereof is less than 0.1% by weight, the improvement of the coating property is not obtained, while if the addition amount is more than 10% by weight, the oligomer bleeds out on the surface of the molding to deteriorate the appearance and also the rigidity of the molding is lowered.

As the oligomer having a hydroxy group at the terminal thereof, the use of a solid oligomer having a wax-like crystalline property is preferred since even when a large amount of the oligomer is compounded, the appearance of the molding is less soiled. It is desirable that the melting point of such a solid oligomer having a wax-like crystalline property is in the range of from 40° C. to 100° C. as the DSC measured value.

In the present invention, it is preferred from the standpoint of the coating property that the oligomer contains a hydroxy group at the terminal in an amount of at least 0.01% by weight, and preferably at least 0.1% by weight, in terms of hydroxymethyl methacrylate.

In the present invention, a filler such as talc can be incorporated in the resin composition forming the surface layer in an amount of from about 3 to 20 parts by weight per 100 parts by weight of the resin composition.

The resin composition forming the surface layer may further contain other additives such as a resin, a rubber, a filler, etc., in the range of not deviating the gist of the present invention. The inorganic filler optionally compounded in the surface layer of the multilayer resin molding of the present invention includes a material which is widely used in the field of general synthetic resins and rubbers. Such an inorganic filler is preferably an inorganic compound that is not reacted with oxygen or water and is not decomposed at kneading and at molding. Examples of the inorganic filler include the oxides of metals such as aluminum, copper, iron, lead, nickel, magnesium, calcium, barium, zinc, zirconium, molybdenum, silicon, antimony, titanium, etc., the hydrates or hydroxides thereof; compounds such as sulfates, carbonates, silicates, etc., and the composite salts and the mixtures of them.

In these inorganic fillers, when the filler is a powdery form, the powdery filler having a diameter of not larger than 30 $\mu$m (more preferably not larger than 10 $\mu$m) is preferred. When the filler is a fibrous filler, it is preferred that the diameter is from 0.1 to 20 $\mu$m (more preferably from 0.1 to 15 $\mu$m) and the length is from 1.0 to 150 $\mu$m (more preferably not longer than 10 $\mu$m).

Among these inorganic fillers, talc, mica, clay, wollastonite, potassium titanate, calcium carbonate, etc., are suitable.

For mixing the resin composition forming the surface layer of the multilayer resin molding of the present invention, they may be dry-blended using a mixer such as a tumbler, a ribbon blender, a Henschel mixer, etc., or they can be continuously kneaded using a batch-type kneading machine (e.g., a banbury mixer) or a continuous mixer. By using these methods in combination (e.g., after dry blending, continuously kneading), they can be more uniformly mixed.

The resin composition thus obtained is usually formed into pellets and the pellets are molded to a desired molding (e.g., bumpers and corner bumpers of automobiles) by a molding method such as an injection molding method, etc., generally carried out in the field of thermoplastic resin compositions.

The mixing temperature and the molding temperature in the case of producing the resin composition forming the surface layer of the multilayer resin molding of the present invention are at a temperature higher than the melting point of the propylene polymer component used in both the cases of melt-kneading and molding, but it is necessary that the temperature does not thermally decompose the propylene polymer component. Thus, the mixing and the molding are generally carried out at a temperature of from 180° C. to 280° C., and preferably from 200° C. to 260° C.

The moldings according to the present invention can be obtained by a so-called sandwich molding method generally practiced in the field of synthetic resins.

In the sandwich molding method, as described above, the material forming the surface layer is injection-molded, then, the material forming the core material is injection-molded, and finally a small amount of the material forming the surface layer is injection-molded to the gate portion. The sandwich molding method is described in detail, e.g., in Hiroe, Molder Series, *Saishin no Shashutu Seikei Gijutu, Sono Jissai to Oyo* (Newest Injection Molding Techniques, Practice and Application), pages 137–144 (published by Sanko Shuppansha, 1988).

In the case of melt-kneading and sandwich molding described above, it is necessary to practice the kneading method or the molding method at a temperature of melting high-molecular weight components such as the propylene polymer, etc., used. However, if the foregoing method is practiced at a high temperature, it sometimes happens that the high-molecular weight components used are thermally decomposed. Thus, the melt-kneading temperature and the injection molding temperature cannot be generally determined without the kinds of the materials used as the surface layer and the core materials and the composition ratio, and are generally from 180° C. to 300° C., and preferably from 190° C. to 280° C.

In the multilayer resin molding of the present invention obtained as described above, the whole surface of the core material is substantially covered with the surface layer. The thickness of the surface layer per the core material thickness of 100 is preferably not more than 100, and particularly preferably not more than 80. If the thickness of the surface layer per the core material thickness of 100 is more than 100, the using amount of the recycling materials is reduced, whereby from the view point of the global environment, the utilization value of the recycling materials is reduced.

The present invention will be described in more detail by referring to the following Examples and Comparative Examples, but the present invention is not construed as being limited thereto.

EXAMPLES 1 TO 5 AND COMPARATIVE EXAMPLES 1 TO 7

As shown in Table 2 below, each of the ethylene polymers was previously dry-blended with 100 parts by weight of waste materials for 3 minutes using a tumbler. Each of the mixtures obtained was melt-kneaded using a vent-equipped twin screw extruder (diameter 30 mm) at a resin temperature of 200° C. to provide pellet-form resin compositions.

The pellets of each resin composition obtained were injection molded using an injection molding machine of a mold clamping force of 100 tons at a resin temperature of 210° C. to provide test pieces for each test shown below.

As the waste materials used, the crushed material obtained by crushing coated polypropylene-made bumpers recovered from a scrapped motorcar (manufactured by Honda Giken Kogyo K.K.) was used.

As the properties of the waste materials, MFR was 11 g/10 minutes, the flexural elastic modulus was 9900 kg/cm$^2$, and the falling cone impact strength was 125 kg-cm.

The waste materials contained 0.9% by weight a urethane coating.

The ethylene polymers used are shown in Table 1 below.

TABLE 1

|   | Kind | Weight Average Mol. Weight | Density (g/cm$^3$) |
|---|---|---|---|
| a | High-density polyethylene | 90.000 | 0.950 |
| b | Low-density polyethylene | 167,000 | 0.916 |
| c | Linear low-density polyethylene | 55,000 | 0.928 |
| d | High-density polyethylene | 190,000 | 0.950 |
| e | High-density polyethylene | 35,000 | 0.950 | mol. weight: Molecular weight

The melt flow rate (hereinafter, is referred to as MFR), the flexural modulus, the falling cone impact strength, and the heat deformation temperature were measured for each of the resin compositions. The measured results are shown in Table 2 below.

MFR was measured according to ASTM-D1238, using a load of 2.16 kg, and at 230° C.

The flexural elastic modulus was measured according to ASTM-D790 under the condition of the bending speed of 25 mm/minute.

The falling cone impact strength was measured as follows.

A plate of 60 mm×60 mm×3.2 mm obtained by injection molding of each composition was used as a test piece, the plate was placed on the pipe-form test stand having an outside diameter of 48 mm, the inside diameter of 44 mm, and the height of 50 mm, and on the plate was placed a core having a curvature of ½ inch. Then, a cone of 3 kg was spontaneously fallen thereto from an optional height, and the height at which the test piece was broken was measured under the condition of −30° C.

The breaking height (cm)×3 (kg) is shown in the following tables as the falling cone impact strength.

The thermal deformation temperature was measured according to ASTM-D648 under the condition of a load of 4.6 kg/cm$^2$.

As comparative examples, resin compositions changing the kind of the ethylene polymer and the compounding ratio were prepared and the same tests as above were carried out. The measurement results are shown in Table 3 below.

TABLE 2

| Ex. No. | Waste Mate. C.A. w.p. | Ethylenic Copolymer Kind | Ethylenic Copolymer C.A. w.p. | MFR g/10' | (P) kg/cm$^2$ | (Q) kg-cm | HDT ° C. |
|---|---|---|---|---|---|---|---|
| 1 | 100 | PE(a) | 5.0 | 9.8 | 9,900 | 200 | 95 |
| 2 | 100 | PE(a) | 10.0 | 9.1 | 10,400 | 270 | 95 |
| 3 | 100 | PE(a) | 13.0 | 8.2 | 10,500 | 300 | 94 |
| 4 | 100 | PE(d) | 7.0 | 9.8 | 10,000 | 210 | 96 |
| 5 | 100 | PE(c) | 5.0 | 12.3 | 10,600 | 240 | 96 |

Ex. No.: Example No.;
C.A.: Compounded Amount
w.p.: Parts by weight;
g/10': g/10 minutes
(P): Flexural Elastic Modulus
(Q): Falling Cone Impact Strength

TABLE 3

| CE No | Waste Mat. C.A. w.p. | Ethylenic Copolymer Kind | Ethylenic Copolymer C.A. w.p. | MFR g/10' | (P) kg/cm$^2$ | (Q) kg-cm | HDT (° C.) |
|---|---|---|---|---|---|---|---|
| 1 | 100 | — | — | 11.0 | 9,900 | 125 | 96 |
| 2 | 100 | PE(d) | 7.5 | 8.9 | 9,900 | 115 | 95 |
| 3 | 100 | PE(d) | 13.0 | 7.3 | 10,200 | 100 | 94 |
| 4 | 100 | PE(e) | 7.5 | 13.2 | 10,500 | 145 | 94 |
| 5 | 100 | PE(a) | 2.0 | 10.7 | 9,900 | 135 | 96 |
| 6 | 100 | PE(b) | 20.0 | 8.7 | 9,000 | >300 | 89 |
| 7 | 100 | PE(b) | 23.0 | 8.1 | 7,900 | >300 | 78 |

CE No.: Comparative Example No.
Other abbreviations are same as in Table 2.

From the results shown in Table 2 and Table 3, it can be seen that in the case of using waste materials alone (Comparative Example No. 1), the falling cone impact strength is particularly low. In the cases of using the waste material as the resin compositions obtained in the examples of the present invention, the flexural elastic modulus, the falling cone impact strength, and the heat deformation temperature are excellent.

In Comparative Example Nos. 2 and 3, wherein the ethylene polymer having a large weight average molecular weight was used, and in Comparative Example No. 4, wherein the ethylene polymer having a small weight average molecular weight was used, the falling cone impact strength was low. In Comparative Example 5, wherein the compounding ratio of the ethylene polymer was small, the falling cone impact strength was low. In Comparative Example Nos. 6 and 7, wherein the compounding amount of the ethylene polymer was large, the falling cone impact strength was high but the heat deformation temperature was low.

EXAMPLES 6 TO 11 AND COMPARATIVE EXAMPLES 8 TO 19

Preparation of Surface Layer Material

Each of the polypropylene resins, the modified PP, each of the thermoplastic elastomers, the oligomer having a functional group at the terminal thereof, and the inorganic filler shown below were mixed at the mixing ratio shown in Table 4 below, the mixture was kneaded using a twin screw extruder at 210° C., and pellets of each composition were produced to provide each surface layer material.

Polypropylene Resin:
PP 1: Crystalline propylene-ethylene block copolymer (ethylene content: 10% by weight, MFR: 10 g/10-minutes)
PP 2: Crystalline propylene-ethylene block copolymer (ethylene content: 7.5% by weight. MFR: 43 g/10-minutes)

Modified PP Resin:
After blending 100 parts by weight of a propylene homopolymer (MFR: 0.5 g/10 minutes) with 4 parts by weight of 2-hydroxyethyl methacrylate (hereinafter, is referred to as HEMA) and 0.8 part by weight of 1,3-bis(t-butylperoxy-isopropyl)-benzene (Perkadocks 14, trade name, made by Kagaku Akuzo K.K.) using a Henschel mixer, the blend was heat-treated by an ordinary extruder at 200° C. to provide a hydroxy-modified PP resin. MFR of the modified PP resin was 100 g/10 minutes and the modification ratio was 0.8% by weight.

Thermoplastic Elastomer:
EPR 1: Ethylene-propylene random copolymer (ethylene content: 62% by weight, MFR: 1.0 g/10 minutes)
EPR 2: Ethylene-propylene random copolymer (ethylene content: 50% by weight, MFR: 12 g/10 minutes)

Oligomer Having Functional Group at Terminal:
HBR 1: Wax-like hydrogenated both terminal hydroxy 1,4-polybutadiene (1,4-bond: 80%, number average molecular weight 2800, iodine number: 1.5, melting point: 72.5° C.)

Inorganic Filler:
Talc: Talc having an average particle size of 2.0 μm.

TABLE 4

| No | PP1 | PP2 | EPR1 | RPR2 | M-PP | HRB1 | TALC |
|----|-----|-----|------|------|------|------|------|
| A  | 65  | —   | 7    | 15   | 10   | 3    | —    |
| B  | 65  | —   | 7    | 15   | 10   | 3    | 7    |
| C  | 52  | —   | 24.5 | 7    | 15   | 1.5  | 10   |
| D  | 34  | 30  | 14   | 15   | 4    | 3    | 7    |
| E  | 55  | —   | 45   | —    | —    | —    | 7    |
| F  | 26  | 45  | 29   | —    | —    | —    | —    |
| G  | 50  | —   | 15   | 15   | 20   | —    | 7    |
| H  | 70  | —   | 27   | —    | —    | 3    | 10   |
| I  | 70  | —   | —    | —    | 20   | 10   | 7    |
| J  | 75  | —   | 10   | —    | 10   | 5    | 7    |

M-PP: Modified PP resin
(Resin composition is weight %, TALC is the weight parts to 100 parts by weight of the resin.)

By using each of the surface layer materials prepared described above and each of the combinations of the compositions in Examples 1 to 5 and Comparative Examples 1 to 7 by the combinations shown in Table 5 and Table 6 below as the core material, each multilayer resin molding was produced.

On the production, the surface layer material was injection molded using an IS350 molding machine (trade name, manufactured by TOSHIBA MACHINE CO., LTD.) and then the core material was injection molded to provide a tabular molding (400 mm×200 mm, thickness: 3.2 mm).

A sample was cut from each molding obtained and the flexural elastic modulus test, the heat deformation temperature test, the falling cone impact strength test, the cross-cut adhesion test, and the gasohol resistance test were applied to each sample. The test results are shown in Table 5 and Table 6 below. The flexural elastic modulus, the heat deformation temperature, and the falling cone impact strength were measured by the same manners as in Examples 1 to 5 and Comparative Examples 1 to 7.

At performing the cross-cut adhesion test and the gasohol resistance test, the tabular molding (400 mm×200 mm, thickness: 3.2 mm) was used, the surface of the molding was washed with a household synthetic detergent (Mamalemon, trade name, made by Kao Corporation), and after washing the molding with water and dried (80° C., 10 minutes), a primer (PB 150, trade name, made by Nippon Bechemical K.K.) at a thickness of about 10 μm and dried (80° C., 10 minutes). Thereafter, two part type urethane coating material for metallic finish (R 212, trade name, made by Nippon Bechemical K.K.) and two part type urethane coating material for clear finish (R 213, trade name, made by Nippon Bechemical K.K.) were coated thereon at a thickness of about 20 μm and a thickness of about 50 μm, respectively and dried (80° C., 10 minutes). Then, the coated molding was allowed to stand in a constant-temperature room (room temperature: 23° C., relative humidity: 50%) for 48 hours to provide a coated product.

In the cross-cut adhesion test, 100 checker patterns with an interval of 1 mm were formed on the coated layer surface of the coated product, and a pressure-sensitive adhesive tape was firmly adhered to each checker pattern with a finger. Thereafter, the pressure-sensitive adhesive tape was abruptly released at an angle of 45 degree. The operation was repeated twice and then the ratio of the remaining checker patters was determined.

In the gasohol resistance test, the coated sample was cut into a piece of 30 mm×65 mm such that the whole cross-sections were exposed, the piece was immersed in gasohol (gasoline/ethanol=90/10 vol %) at 20° C. for 120 minutes, and thereafter, the presence or absence of releasing of the coated layers was observed.

In the gasohol resistance test, a sample wherein no swelling and no releasing of the coated layers were observed was evaluated as "A", a sample wherein swelling and releasing of the coated layers were observed a little was evaluated as "B", and a sample wherein swelling and releasing were observed in the greater part of the coated layers was evaluated as "C". The results are shown in Table 5 and Table 6 below.

TABLE 5

| Ex | Kind of Material Core* | SLM | (P) kg/cm² | HDT (° C.) | (Q) kg-cm | (R) (%) | (S) |
|----|------|-----|--------|------|------|---------|---|
| 6  | 1 | B | 10,800 | 101 | >300 | 100/100 | A |
| 7  | 3 | B | 11,000 | 100 | >300 | 100/100 | A |
| 8  | 4 | A | 8,900  | 94  | >300 | 100/100 | A |
| 9  | 5 | B | 11,000 | 102 | >300 | 100/100 | A |
| 10 | 1 | C | 9,900  | 99  | >300 | 100/100 | A |
| 11 | 4 | D | 10,800 | 101 | >300 | 100/100 | A |

(*): Core material shown by the number of the example preparing the core material.
Ex: Example
(P): Flexural Elastic Modulus
(Q): Falling Cone Impact Strength
(R): Cross-cut Adhesion Test
(S): Gasohol Resistance Test (after immersing 120 minutes)
SLM: Surface layer material

TABLE 6

| CE | Kind of Material Core | SLM | (P) kg/cm² | HDT (° C.) | (Q) kg-cm | (R) (%) | (S) |
|----|------|-----|--------|-----|------|---------|---|
| 8  | CE 1 | A | 8700   | 94  | 250  | 100/100 | A |
| 9  | CE 2 | B | 10,800 | 101 | 190  | 100/100 | A |
| 10 | CE 3 | B | 10,950 | 100 | 160  | 100/100 | A |
| 11 | CE 4 | C | 10,000 | 98  | 210  | 100/100 | A |
| 12 | CE 5 | D | 10,800 | 100 | 200  | 100/100 | A |
| 13 | CE 7 | A | 8300   | 85  | >300 | 100/100 | A |
| 14 | Ex 1 | E | 7700   | 92  | >300 | 100/100 | C |
| 15 | "    | F | 10,600 | 100 | >300 | 100/100 | C |
| 16 | "    | G | 10,000 | 99  | >300 | 100/100 | C |
| 17 | "    | H | 10,600 | 100 | >300 | 100/100 | C |
| 18 | "    | I | 12,600 | 105 | >300 | 100/100 | B |
| 19 | "    | J | 12,800 | 105 | >300 | 71/100  | B |

CE: Comparative Example, Ex: Example
Others are same as in Table 5.

From the results shown in Table 5 above, it can be seen that the moldings in the examples of the present invention have excellent characteristics in all of the rigidity, the heat resistance, the impact resistance, the coating property, and the gasohol resistance.

On the other hand, from the results of Table 6, it can be seen that samples apart from the present invention could not have these various characteristics.

The moldings obtained by using the resin composition of the present invention contain therein coating material resins but the impact resistance of the moldings are greatly improved as compared with the original waste materials. Thus, the resin composition of the present invention can be used for moldings requiring a high impact resistance and can be re-used as moldings for various kinds of uses such as motorcar parts, electric products, daily necessaries, miscellaneous goods, etc.

In particular, in the present invention, since a small amount of the ethylene polymer and a large amount of waste materials are used, the using amount of waste materials is large and thus the invention is economically advantageous and also an excellent technique from the standpoint of the environmental issues and the protection of resources.

The multilayer moldings of the present invention show the following advantages.

(1) Since recycling materials are used, the invention contributes the global environmental protection.

(2) While using recycling materials, the invention gives molded products excellent in the coating property.

(3) The moldings are excellent in the impact resistance at low temperature.

(4) The moldings are excellent in the rigidity (flexural elastic modulus).

(5) The moldings have a good heat resistance.

(6) The moldings are excellent in the coating property without need of a trichloroethane treatment and also are excellent in the gasohol resistance.

Since the moldings of the present invention have the advantages as described above, they can be utilized in many fields including motorcar exterior parts such as bumpers, spoilers, side seal garnish, etc., and two-wheeled vehicle parts such as front fenders, body covers, etc.

While the invention has been described in detail and with reference to specific examples thereof, it will be apparent to one skilled in the art that various changes and modifications can be made therein without departing from the spirit and scope thereof.

What is claimed is:

1. A resin composition utilizing coated resin moldings, said resin composition comprising 100 parts by weight of a crushed material of coated polypropylene resin moldings compounded with from 3 to 15 parts by weight of an ethylene polymer having a weight average molecular weight of from 50,000 to 180,000, said resin composition being prepared by dry blending using a mixing apparatus and by melt-kneading using a mixer at a temperature of from 180 to 270° C. wherein the coated polypropylene resin moldings are coated with an acrylate a polyurethane or an unsaturated polyester resin and wherein the ethylene polymer is a homopolymer or ethylene-α-olefin copolymer wherein the α-olefin has not more than 12 carbon atoms.

2. A resin composition as claimed in claim 1, wherein said polyolefin resin moldings are bumpers for motorcars.

3. A resin composition as claimed in claim 1, wherein the weight average molecular weight of said ethylene polymer is from 55,000 to 130,000.

4. A resin composition as claimed in claim 1, wherein the amount of said ethylene polymer is from 3 to 13 parts by weight per 100 parts by weight of said crushed material of coated polyolefin resin moldings.

5. A resin composition as claimed in claim 1, wherein the coated polypropylene resin molding have a coating of the acrylate.

6. A resin composition as claimed in claim 1, wherein the coated polypropylene resin moldings have a coating of the polyurethane.

7. A resin composition as claimed in claim 1, wherein the coated polypropylene resin moldings have a coating of the unsaturated polyester.

8. A resin composition as claimed in claim 1, wherein the coated polypropylene resin moldings have a coating of the acrylate, the polyurethane or the unsaturated polyester in an amount of not more than 3% by weight based on the weight of the coated polypropylene resin moldings.

9. A resin composition as claimed in claim 1, wherein the crushed material of the coated polypropylene resin moldings has a longest length of from 0.1 mm to 10 mm.

10. A resin composition as claimed in claim 1, wherein from 5 to 13 parts by weight of the ethylene polymer having a weight average molecular weight from 50,000 to 180,000 is compounded with the crushed material.

11. A resin composition as claimed in claim 1, which when used in combination with a polypropylene-based surface coating provides a molding with improved impact resistance without impaired rigidity and heat resistance as compared to a molding containing an otherwise identical resin composition which does not contain said high density polyethylene.

* * * * *